(12) United States Patent
Slatkin

(10) Patent No.: US 10,960,864 B2
(45) Date of Patent: Mar. 30, 2021

(54) DUAL SPEED AND POSITION WHEEL TRANSDUCER

(71) Applicant: HYDRO-AIRE, INC., Burbank, CA (US)

(72) Inventor: Andrew Brett Slatkin, Tarzana, CA (US)

(73) Assignee: Hydro-Aire, Inc., Burbank, CA (US)

(*) Notice: Subject to any disclaimer, the term of this patent is extended or adjusted under 35 U.S.C. 154(b) by 752 days.

(21) Appl. No.: 15/688,694

(22) Filed: Aug. 28, 2017

(65) Prior Publication Data
US 2019/0061723 A1 Feb. 28, 2019

(51) Int. Cl.
| B64C 25/42 | (2006.01) |
| B60T 8/32 | (2006.01) |
| B60T 8/88 | (2006.01) |
| B60T 8/172 | (2006.01) |
| B60T 17/22 | (2006.01) |
| B60T 8/17 | (2006.01) |
| F16D 66/02 | (2006.01) |
| G01P 3/488 | (2006.01) |
| B60T 13/66 | (2006.01) |
| B60T 8/171 | (2006.01) |
| F16D 66/00 | (2006.01) |

(52) U.S. Cl.
CPC .............. *B60T 8/885* (2013.01); *B60T 8/171* (2013.01); *B60T 8/1703* (2013.01); *B60T 8/1725* (2013.01); *B60T 13/662* (2013.01); *B60T 17/22* (2013.01); *B64C 25/42* (2013.01); *F16D 66/028* (2013.01); *G01P 3/488* (2013.01); *B60T 8/325* (2013.01); *B60T 8/329* (2013.01); *B60T 2270/413* (2013.01); *F16D 2066/003* (2013.01)

(58) Field of Classification Search
CPC . G01P 3/488; G01P 3/42; B64C 25/42; B60T 8/325
See application file for complete search history.

(56) References Cited

U.S. PATENT DOCUMENTS

| 5,032,750 A * | 7/1991 | Hayashi | G01D 5/2086 310/83 |
| 6,935,193 B2 * | 8/2005 | Heisenberg | B62D 6/10 73/862.324 |
| 7,578,185 B2 * | 8/2009 | Ether | G01P 3/42 324/160 |

* cited by examiner

*Primary Examiner* — Brian M O'Hara
(74) *Attorney, Agent, or Firm* — Fulwider Patton LLP

(57) ABSTRACT

A wheel speed measuring device for an aircraft braking system uses dual technology packaged in a single transducer that incorporates the robust and reliable variable reluctance technology along with a secondary package for measuring position and velocity bi-directionally for low speed and taxi operations. The transducer of the present invention is preferably incorporated into the envelope of the axle to allow both retrofit on existing aircraft and to maintain existing axle design and configuration.

10 Claims, 4 Drawing Sheets

DUAL SPEED AND POSITION WHEEL TRANSDUCER

BACKGROUND

Aircraft braking systems for multi-wheel brakes of complex aircraft may include wheel speed transducers or sensors for measuring the instantaneous wheel speed of the individual wheels of the aircraft landing gear. Such wheel speed transducers are particularly important in aircraft braking systems where maximum braking efficiency is desired for a variety of runway surface conditions. Wheel speed transducers for such braking systems convert the rotational speed of the associated wheel axle to electrical signals. This wheel speed signal is then employed by brake control circuitry such as antiskid control circuitry and/or automatic brake control circuitry to control the braking activity of the vehicle. Wheel speed transducers, sometimes referred to as tachometers, include one part that is fixed to the axle or aircraft frame and another part that is connected to and rotates with the associated wheel. Accordingly, a coupler is generally required to interconnect the rotatable member to the wheel.

Some current wheel speed devices for aircraft antiskid systems employ variable reluctance mechanisms. Although these devices are reliable and robust, the amplitude of the wheel speed signal varies as a function of the wheel speed and it diminishes significantly as the rotational speed nears zero. These devices are also unable to distinguish a direction of wheel velocity, but are limited to a magnitude only.

Variable reluctance sensors need waveform shaping for their output to be digitally readable. The normal output of a VR sensor is an analog signal, shaped much like a sine wave. The frequency of the analog signal is proportional to the sensor's velocity output. This analog waveform must be squared up, and flattened off by a comparator-like electronic chip to become digitally readable. As used to measure angular velocity of a rotating wheel, when a sensor on the rotating wheel passes by the face of a magnet, the amount of magnetic flux passing through the magnet and consequently the coil can vary. When the magnet is close to the sensor, the flux is at a maximum. When the magnet is further away, the flux is reduced. The moving target thus results in a time-varying flux that induces a proportional voltage in the coil. Subsequent electronics are then used to process this signal to get a digital waveform that can be more readily counted and timed. However, as the velocity slows, the accuracy diminishes because conversion of the sine wave to a digital output becomes unstable and less reliable.

It has been hypothesized that shipboard unmanned aerial vehicles ("UAVs") will need to have locally referenced feedback for navigation, i.e., angular position of its wheels, in order to properly taxi on the deck. Similarly, proposed motorized taxi systems for airliners will require both the ability to measure zero wheel speed as well as movement in both forward and rearward directions. Aircraft designers recognize that aircraft braking systems using present technology are unable to meet these increased demands.

SUMMARY OF THE INVENTION

The present invention improves on the existing technology for use with antiskid brake control by adding the capability of accurately measuring both angular position and rotational velocity of the wheel as the wheel speed approaches zero. The present invention is further capable of determining angular position and rotational velocity in both the forward and reverse directions. The invention uses dual technology packaged in a single transducer that incorporates the robust and reliable variable reluctance technology along with a secondary package for measuring position and velocity bi-directionally for low speed and taxi operations. The transducer of the present invention is preferably incorporated into the envelope of the axle to allow both retrofit on existing aircraft and to maintain existing axle design and configuration.

The secondary componentry for measuring angular position and velocity is, in a first preferred embodiment, a magnetic encoder with an angular resolver (or other discrete proximity probes such as capacitive probes, inductive probes, or Hall Effect probes). The invention is particularly suited for unmanned aerial vehicles and aircraft that use motorized landing gear systems for taxi operations.

DETAILED DESCRIPTION OF THE PREFERRED EMBODIMENTS

Figure 1:
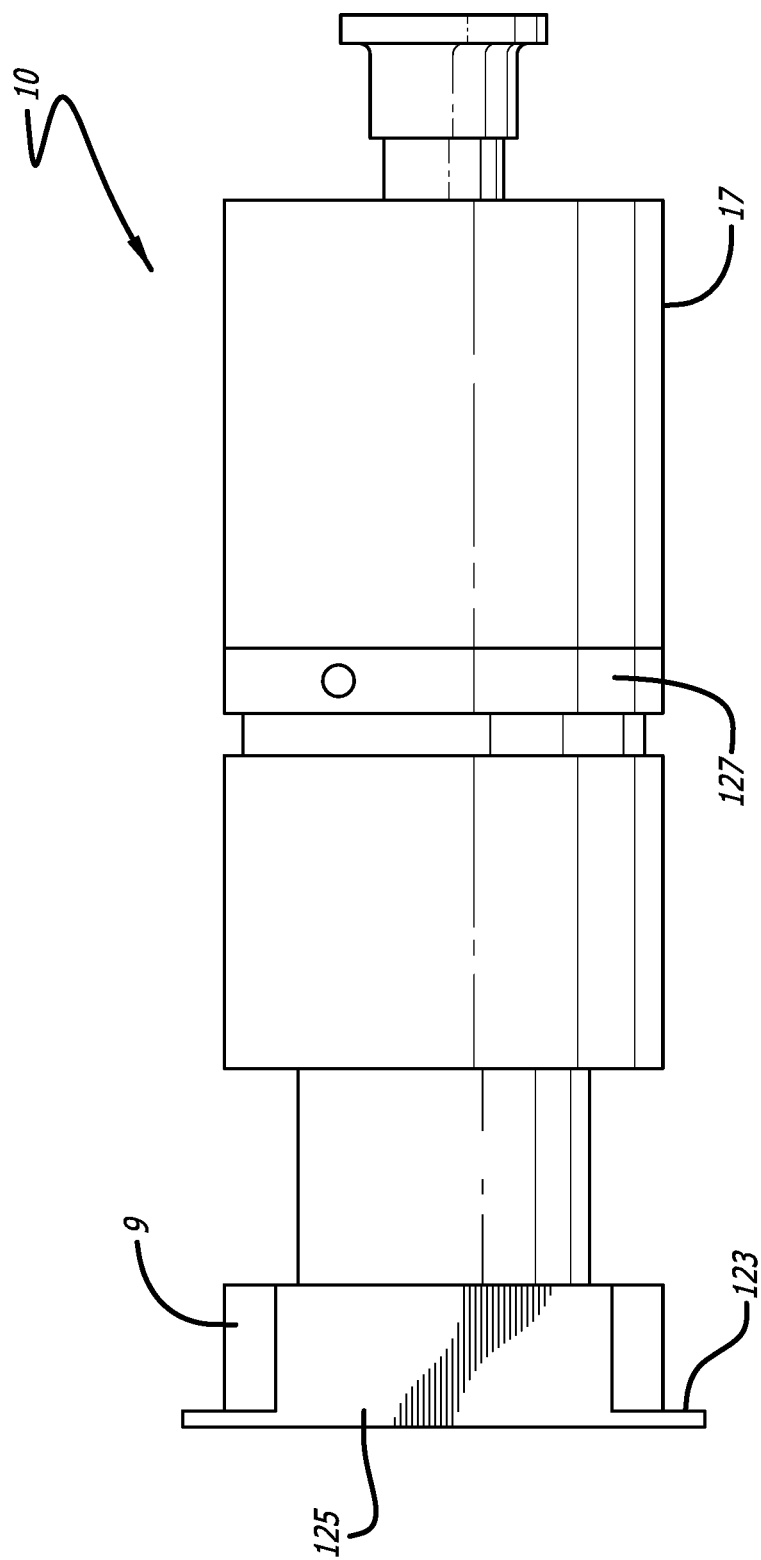
FIG. 1 is an elevated, perspective view of a transducer of the present invention.

The present invention provides a wheel speed transducer that is part of an antiskid braking system for an aircraft to prevent deep skids prior to controlled deceleration. Deep skids are a particular problem for aircraft since repeated deep skids can damage tires and reduce braking efficiency. With reference to FIG. 1, the present invention is embodied in a wheel speed transducer 10 for each wheel brake of a landing gear of an aircraft, for measuring wheel speed and generating wheel speed signals that are a function of the rotational speed of the brake wheel. This embodiment of the wheel speed transducer includes a dual coil variable reluctance mechanism used for anti-skid control in combination with, and contained within the same housing as, a magnetic encoder that is used for wheel speed detection below approximately ten knots and for forward versus reverse motion detection, where the magnetic encoder can also be used to measure angular displacements of the wheel in addition to angular velocity. These two outputs (the variable reluctance transducer and the magnetic encoder) are independent of each other, and the combination allows the present invention to detect wheel speeds down to zero speed in forward and reverse directions.

The wheel speed transducer 10 of the present invention includes a cylindrical body section 17 of ferromagnetic material that is mounted proximal to the axle of the aircraft landing gear. A coupling member 8 is formed in a flanged wheel axle adapter 9 that includes transverse holes 121 for receiving a fastener or pin (not shown). The flanged wheel axle adapter 9 has a radial lip 123 forming a circumferential edge, and the flanged wheel axle adapter 9 has first and second truncated, flattened sides 125 and a hollow interior space. The cylindrical body section 17 has a medial circumferential recess 127 with spaced apertures for mounting the transducer 10 to the landing gear (not shown).

Figure 2:
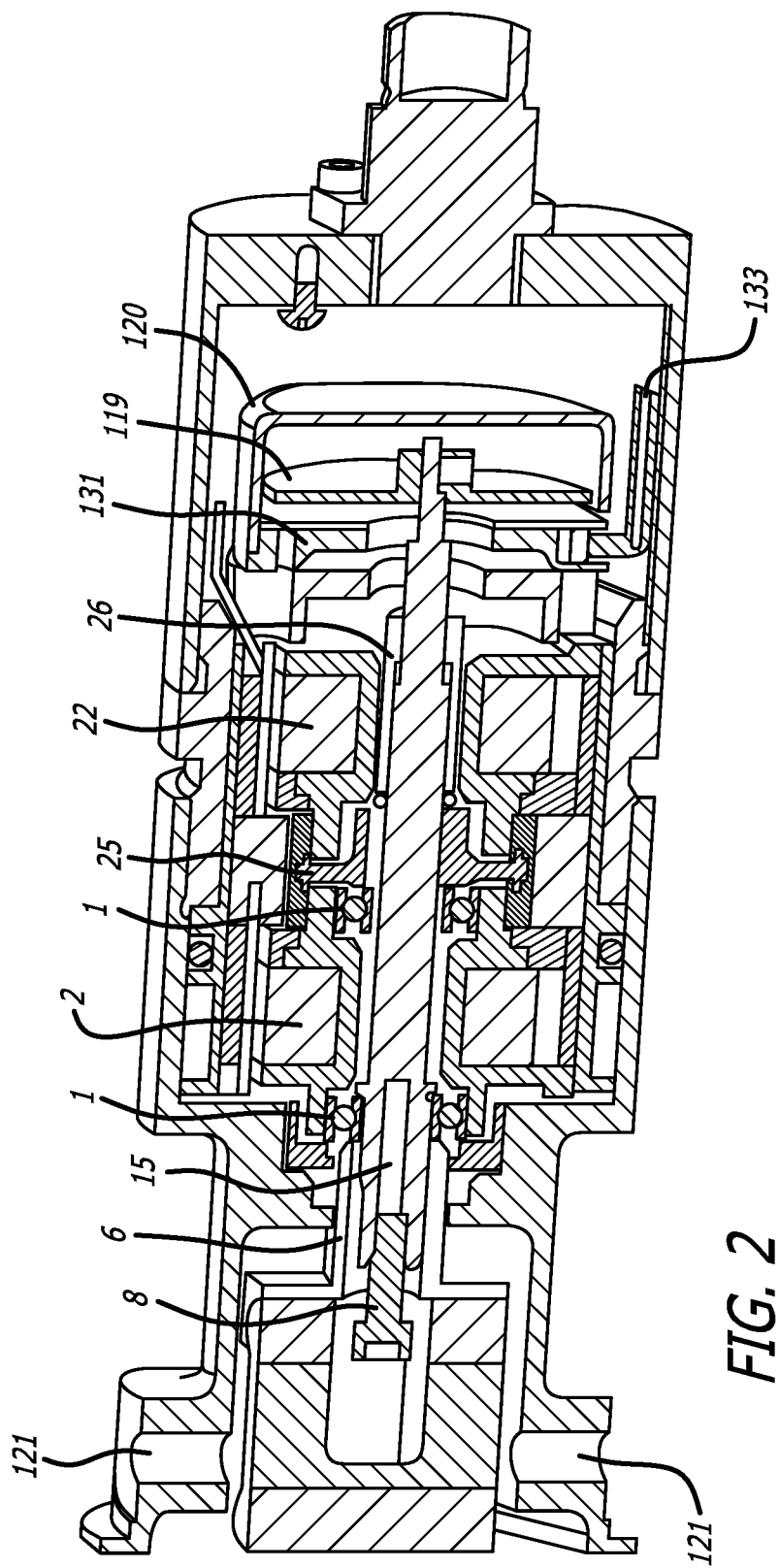
FIG. 2 is a first longitudinal cross sectional view of the transducer of FIG. 1.

FIG. 2 illustrates the dual packages of the transducer for determining wheel speed and angular position in a singular housing. Within the hollow interior space of the flanged wheel axle adapter 9 is a coupling member 8 that is tapped or threaded into a central shaft 15 that rotates within the hollow central cavity of the body section 17. The coupling member 9 is mounted to a output shaft coupling 5, which includes a distal end 5a that is located in the rotating wheel hub and imparts the wheel's rotation onto the central shaft 15. The shaft 15 is supported at a proximal end by a retainer seal 6, at intermediate locations by first and second sets of ball bearings 1 that permit the shaft to freely rotate within the body section 17, and distally by a collar 26.

The assembly includes a primary coil 2 and a secondary coil 22 about the central shaft 15 that serves to form the dual coil variable reluctance speed detector. The variable reluctance transducer assembly is used for antiskid control and is used for speeds above ten knots. The rotor assembly 25 and accompanying electronics function in a well-known manner to generate a somewhat sinusoidal output signal (or signals in this case of a dual coil assembly) having a frequency that varies linearly as a function of instantaneous wheel speed.

Figure 3:
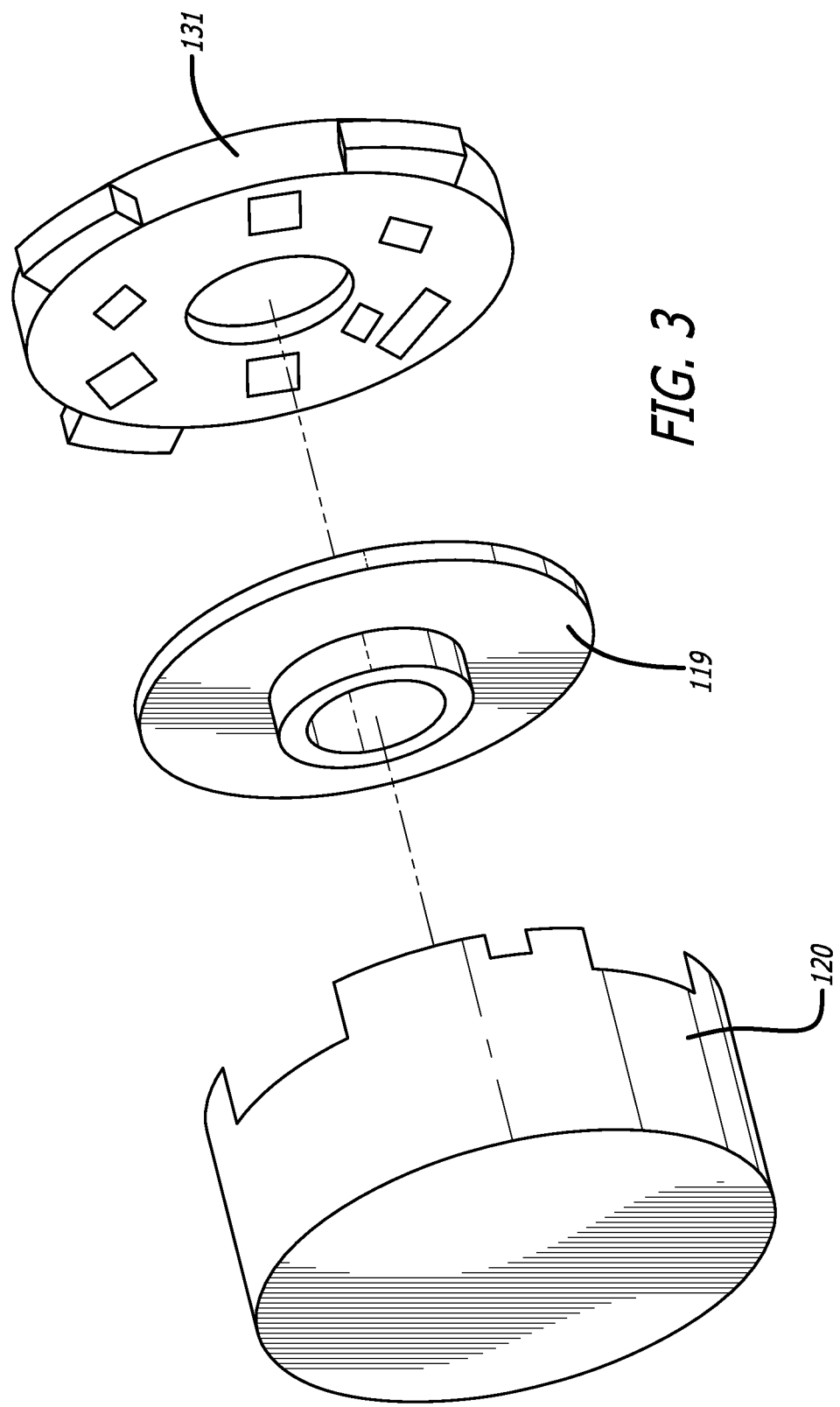
FIG. 3 is an enlarged, exploded view of the magnetic encoder of FIG. 2.

Additionally disposed in the body 17 of the transducer package in a first preferred embodiment is an encoder assembly 19 shown in FIG. 3 mounted at the end of the shaft 26, where the encoder assembly 19 includes a magnetic encoder wheel 119 disposed on the shaft 15 and a cable 133 connected thereto. In this embodiment, the magnetic encoder wheel is enclosed by a cylindrical encoder cover 120. The magnetic encoder wheel 119 is a magnetized wheel that rotates in close proximity to a pair of magnetic sensors arranged on a circuit board 131 in order to produce quadrature signals whose frequency and phasing represent the rotational velocity, i.e., the rotational speed and direction. The quadrature signals are fed via a cable 133 to an off-board, signal conditioning, electronic circuitry. The number of magnetized pole pairs on the magnetic encoder wheel 119 determines the angular resolution of the magnetic encoder 119. The magnetic encoder is anticipated to be used primarily for speeds below ten knots and to detect such movement in forward and reverse directions. The two velocity outputs, i.e., electrical signals representing the wheel speed as measured by the variable reluctance mechanism as well as that measured by the magnetic encoder, are completely independent of each other.

The rotor/stator assembly coupled with the magnetic encoder assembly 119 in the same housing 17 allows for both traditional wheel speed determination and dual position/velocity/direction determination in the same compact, robust transducer.

Other embodiments of this invention utilize other types of subassemblies to measure angular position and velocity in place of the magnetic encoder assembly 19. These other embodiments can use an optical encoder assembly, which as designed produces the same type of electrical quadrature signals as that of the magnetic encoder. Such an embodiment would be connected to similar, or identical, signal conditioning, electronic circuitry. Another, alternate embodiment replaces the magnetic encoder assembly 19 with an angular resolver. Angular resolvers are often used to measure rotational position and velocity of rotating, mechanical components under harsh environmental conditions. An embodiment that incorporates an angular resolver would require a different form of signal conditioning, electronic circuitry for conversion of the output, electrical signals.

Figure 4:
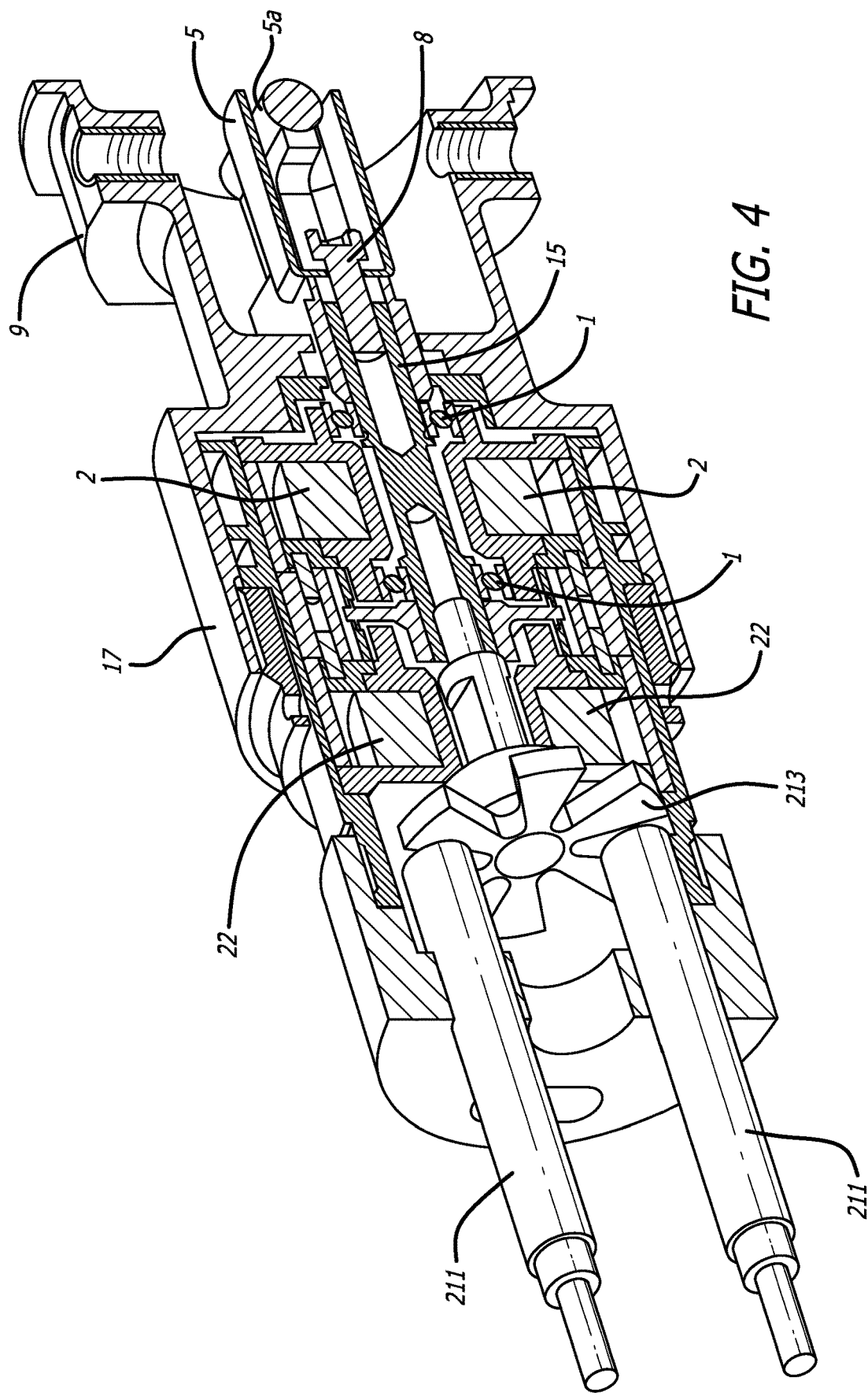
FIG. 4 is an enlarged, elevated perspective cross-sectional view of a second embodiment of the present invention.

Additionally, FIG. 4 illustrates a cross sectional view of another alternate embodiment of a wheel speed transducer 100, where the magnetic encoder 19 is replaced with a pair of inductive probes 211 (also referred to in the art as inductive proximity sensors or inductive proximity switches) adjacent to a toothed metal wheel 213. As a tooth on the wheel passes proximally to the sensor, the magnetic field surrounding the coil is changed. As a result of the magnetic field changes in the inductive probe a voltage is induced that is proportional to the strength and rate of change of the magnetic field. One complete oscillation is produced for each tooth that passes adjacent to the sensor pole pin. The use of two inductive probes produces electrical quadrature signals analogous to those produced by the magnetic encoder and optical encoder embodiments. If the toothed wheel is permanently magnetized, then Hall Effect probes can be used in place of the inductive probes 211 to provide the secondary electrical signals in the same form of quadrature that represents rotational position and velocity of the rotating shaft. Capacitive probes (capacitive proximity sensors) may also be used in place of inductive probes in a functional similar embodiment of this invention, i.e., the capacitive probes would trigger with the passage of a toothed wheel.

A key feature of all of these embodiments is that the secondary, independent measurement of rotational position and velocity is independent of rotational speed. In this manner, the dual position and velocity transducer utilizes both variable reluctance and a secondary low speed technology to evaluate aircraft wheel speed at variable speeds in both forward and reverse directions.

The present invention, which uses both primary and secondary measuring technologies in a single transducer package is, unlike prior art systems, both robust for the flight-safety critical purpose of anti-skid brake control and effective in measuring large and small angular velocities in both directions. This improves safety and allows for better control of unmanned vehicle taxi control as well as other landing functions. While the present invention has been described in shown in terms of a preferred embodiment, it is to be understood that one of ordinary skill in the art would readily appreciate modifications and substitutions to the foregoing examples, and the present invention is intended to encompass all such modifications and substitutions.

We claim:

1. A wheel speed transducer for an aircraft braking system, comprising:
    a housing defining a hollow central interior;
    a shaft extending longitudinally within said housing and mounted for rotation therein;
    a first wheel speed measuring device comprising a variable reluctance wheel speed device coupled to said shaft within said housing; and
    a second wheel speed measuring device within said housing and coupled to said shaft, said second wheel speed measuring device configured for distinguishing between a forward wheel speed and a reverse wheel speed;
    wherein an output of the first wheel speed measuring device and the output of the second wheel speed measuring device are independent of each other.

2. The wheel speed transducer of claim 1, wherein the second wheel speed measuring device measures rotational position of the wheel in forward and reverse directions.

3. The wheel speed transducer of claim 1, wherein the second wheel speed measuring device is a magnetic encoder including a magnetic encoder wheel rotating in proximity to a magnetic sensor.

4. The wheel speed transducer of claim 1, wherein the second wheel speed measuring device is an inductive device including a plurality of inductive probes and a toothed, target wheel.

5. The wheel speed transducer of claim 1, wherein the second wheel speed measuring device includes Hall Effect probes and a magnetized target wheel.

6. The wheel speed transducer of claim 1, wherein the second wheel speed measuring device includes capacitive probes.

7. The wheel speed transducer of claim 1, wherein the second wheel speed measuring device includes an angular resolver.

8. The wheel speed transducer of claim 1, the second wheel speed measuring device measures an angular position and displacement of a wheel.

9. The wheel speed transducer of claim 1, wherein the variable reluctance wheel speed device is a dual coil device.

10. The wheel speed transducer of claim 1, wherein the variable reluctance wheel speed device is a single coil device.

\* \* \* \* \*